(12) United States Patent
Abe

(10) Patent No.: US 6,681,576 B1
(45) Date of Patent: Jan. 27, 2004

(54) CONVECTIVE POWER GENERATING METHOD AND DEVICE

(76) Inventor: Toshihiro Abe, 17-10-1, Shimonitanai, Hanamaki-shi, Iwate 025-0006 (JP)

(*) Notice: Subject to any disclaimer, the term of this patent is extended or adjusted under 35 U.S.C. 154(b) by 0 days.

(21) Appl. No.: 10/239,689

(22) Filed: Sep. 25, 2002

(51) Int. Cl.⁷ ............................................... F01K 13/00
(52) U.S. Cl. .......................................... 60/643; 60/645
(58) Field of Search ........................ 60/325, 643, 645

(56) References Cited

U.S. PATENT DOCUMENTS

| | | | | |
|---|---|---|---|---|
| 3,958,951 A | * | 5/1976 | Woebcke et al. | 422/201 |
| 4,017,755 A | * | 4/1977 | Litz | 310/40 R |
| 4,624,104 A | * | 11/1986 | Stroem | 60/806 |

FOREIGN PATENT DOCUMENTS

| | | |
|---|---|---|
| JP | 60-119306 | 6/1985 |
| JP | 61-232387 | 10/1986 |
| JP | 6-147098 | 5/1994 |
| JP | 11-107907 | 4/1999 |
| JP | 2000-303947 | 10/2000 |
| JP | 2000-356181 | 12/2000 |

* cited by examiner

*Primary Examiner*—Hoang Nguyen
(74) *Attorney, Agent, or Firm*—Wenderoth, Lind & Ponack, L.L.P.

(57) ABSTRACT

A method for improving the efficiency of power generation in a method for power generation comprising forcefully forming an ascending gas flow channel and a descending gas flow channel within a closed zone with a gas sealed therein, generating a whirling flow by the synergistic interaction of both and rotating a turbine by the whirling flow to generate electric power as well as a device for realizing the same. A whirling flow to rotate fans (3,4) is generated by installing a cylindrical rotor (2) between the ascending gas flow channel and the descending gas flow channel. Optionally, a second cylindrical rotor (12) is further installed between the ascending gas flow channel and the partition wall isolating the closed zone from outside so as to reduce the friction between the ascending gas flow and the descending gas flow. And, the present invention is suitable as a method for power generation by utilizing, for example, a temperature difference occurring in nature.

7 Claims, 7 Drawing Sheets

CONVECTIVE POWER GENERATING METHOD AND DEVICE

TECHNICAL FIELD

The present invention relates to an improvement, in a method and device for power generation by utilizing the energy of a phenomenon of artificially generated whirlwind, to accomplish a high efficiency of energy utilization.

BACKGROUND ART

There was already made an attempt for power generation in which the same phenomenon as a whirlwind occurring in nature was artificially generated and a turbine was driven by utilizing the rotating energy of the gas flow thereof.

The inventor previously proposed (Japanese Patent Kokai No. 6-147098), as a device for realizing this attempt, a device comprising a cylinder hermetically sealing a gas for heat exchange, a cooling pipe installed within the aforementioned cylinder in the axial direction to which a fluid for cooling was introduced from an end in the axial direction, a heating pipe installed within the aforementioned cylinder in the axial direction, to which a fluid for heating was introduced from the other end in the axial direction, a cooling flow channel for cooling of the gas in the form of a spiral pipe installed in contact with the circumference of the aforementioned cooling pipe, a heating flow channel for heating of the gas in the form of a spiral pipe installed in contact with the circumference of the aforementioned heating pipe and opening at both ends to produce a flow of the gas, a fan installed at least one of the outlet and inlet openings of the aforementioned cooling flow channel and heating flow channel and an output shaft rotating jointly with this fan, in which the gas heated in the heating flow channel was introduced on one hand into the cooling flow channel and the gas cooled in the cooling flow channel was introduced on the other hand into the heating flow channel to generate convection of the gas circulating in a spiral movement between the cooling flow channel and the heating flow channel and the aforementioned fan was rotated by the convection generated with the temperature difference of the aforementioned gas to generate electric power.

In such a device, however, the gas under high pressure in the cooling flow channel is cooled and contracted to be imparted with an increased specific gravity and moves by circulating the long-distance spiral flow channel to produce a centrifugal force so that the gas is pressed by the centrifugal force against the circumferential wall of the convective flow channel resulting in a great energy loss due to the frictional force generated thereby.

And, in order to construct a particularly large model of the device, use of a planar fin for heat exchange is necessarily accompanied by an increase in the distance of heat conduction per unit width with a great decrease in the rate of heat exchange and, in addition, the wall thickness of the cylinder wall must be increased and accompanied by a mass increase and causing a decrease in the power output due to a decrease in the rate of heat exchange with a medium coming from outside.

The present invention has been completed with an object, by overcoming such defects in a conventional convective power-generating device, to provide an improved method for conversion of a convectional energy to a power-generating energy with a high efficiency and a power-generating device for realization thereof.

DISCLOSURE OF THE INVENTION

The present invention provides, in a method in which an ascending gas flow channel and a descending gas flow channel are forcedly formed within a closed zone sealing a gas to generate a convolutional flow by the synergistic effect of both and a turbine is driven by the convolutional flow to generate electric power, a method in which the efficiency of power generation is increased by installing a cylindrical rotor between the aforementioned ascending gas flow channel and the descending gas flow channel and, if appropriate, between the ascending gas flow channel and a partition wall isolating the closed zone from outside as well as a device for realization thereof.

BEST MODE FOR CARRYING OUT THE INVENTION

In the following, the method and device of the present invention are described by making reference to the accompanying drawing.

Figure 1:
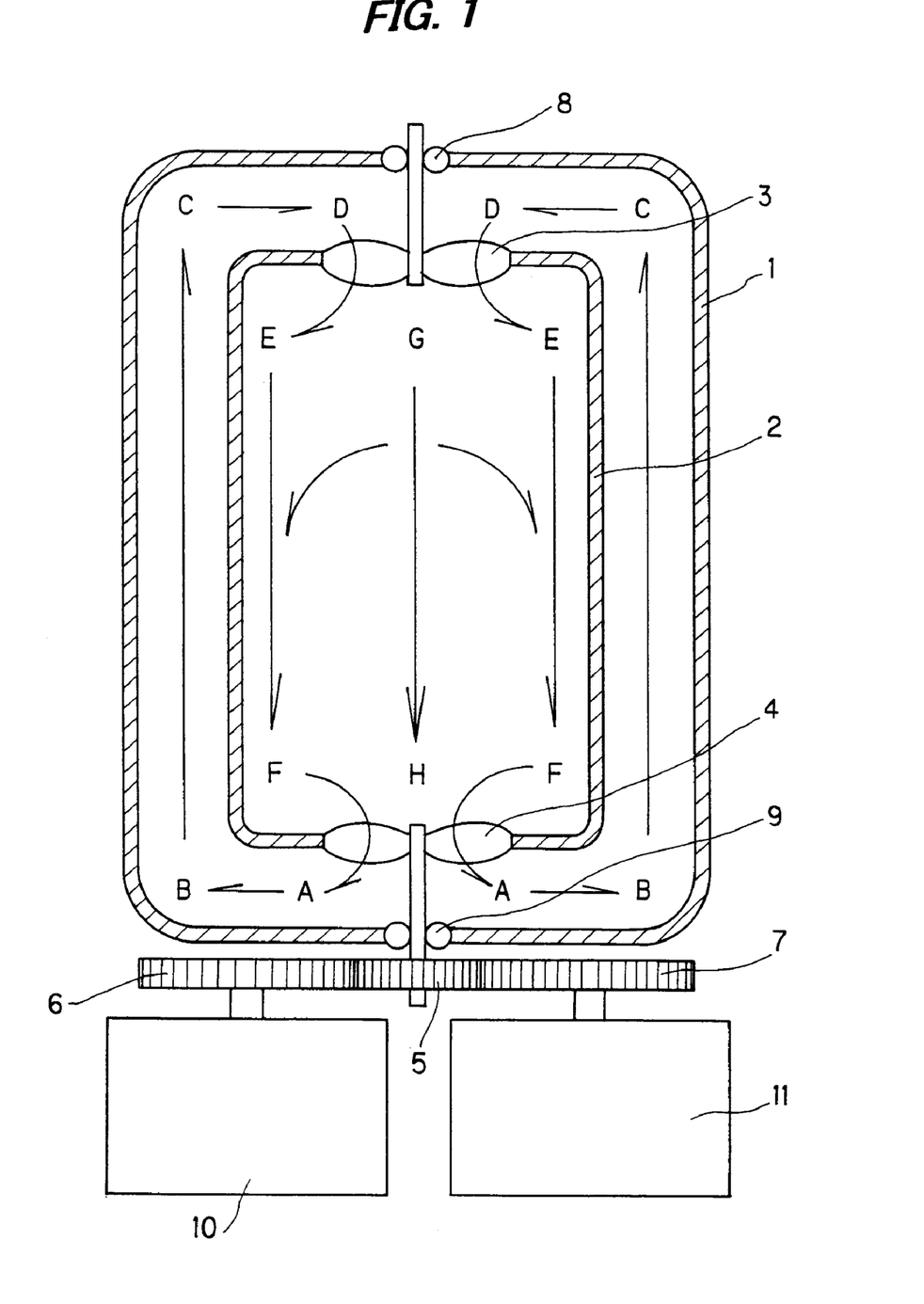
FIG. 1 is a schematic illustration of a cross sectional view of an example where, in the method of the present invention, a cylindrical rotor is installed between the ascending gas flow channel and the descending gas flow channel.

In FIG. 1, which is a schematic illustration of a cross sectional view of an example where, in the method of the present invention, a cylindrical rotor is installed between the ascending gas flow channel and the descending gas flow channel, a cylindrical rotor 2 fixed to a pair of upper and lower fans 3,4 pivotally supported in a rotatable fashion via pivotal supporting members 8,9 is contained within a cylindrical partition wall 1 isolating the closed zone sealing a gas from outside while the lower fan 4 is connected to the input shaft of a power generator 10 via gears 5,6 and to the output shaft of a motor 11 via gears 5,7.

The ascending gas flow forcedly generated by contacting with a high-temperature medium ascends through the flow channel of A→B→C→D and, on the other hand, the descending gas flow forcedly generated by contacting with a low-temperature medium descends through the flow channels of D→E→F→A and G→H to form a convolutional flow at the positions of the fans 3,4 to cause rotation of the fans 3,4 and, at the same time, to cause rotation of the cylindrical rotor 2 fixed thereto.

Figure 2:
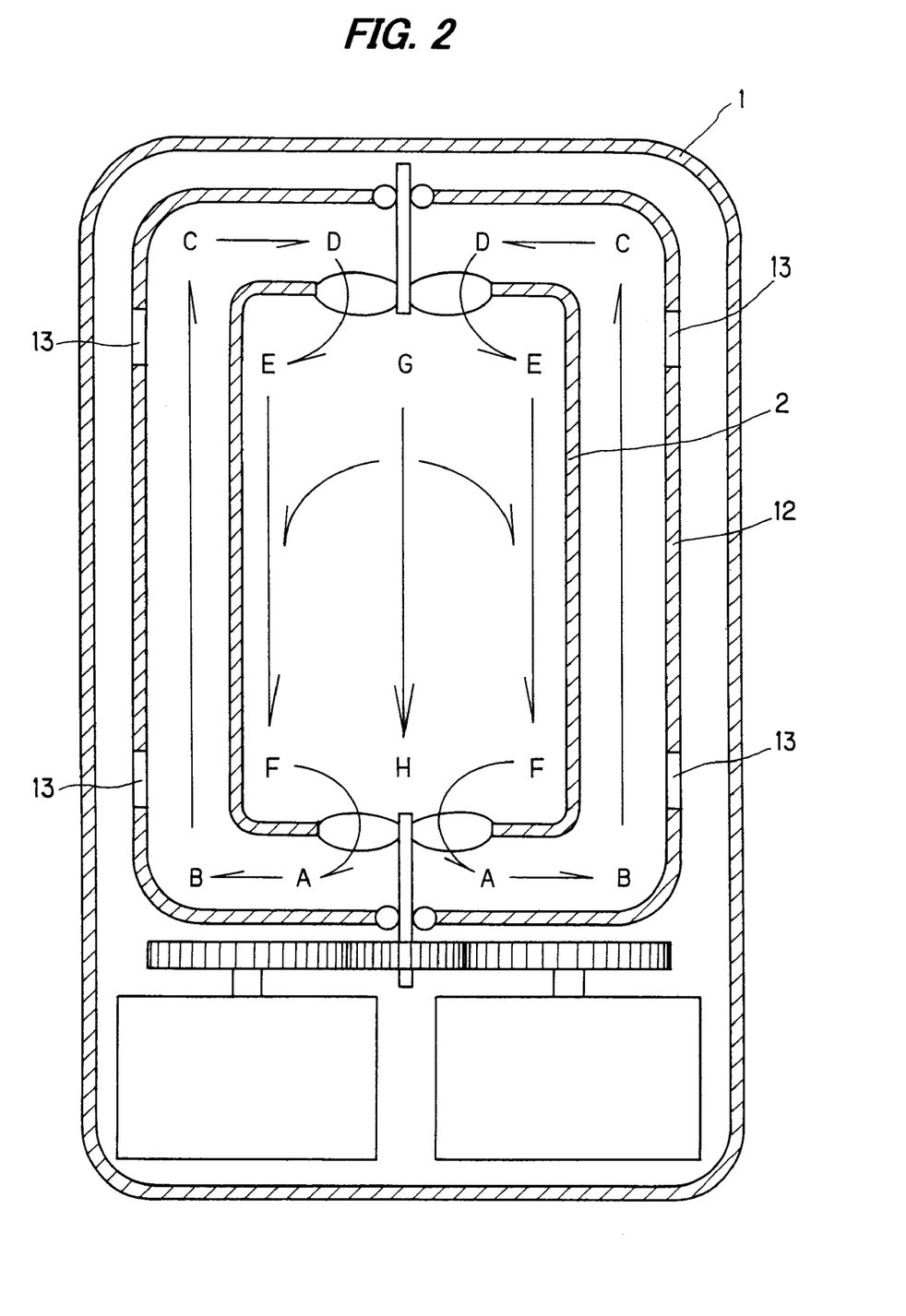
FIG. 2 is a schematic illustration of a cross sectional view of an example where, in the method of the present invention, cylindrical rotors are installed between the ascending gas flow channel and the descending gas flow channel and between the ascending gas flow channel and the partition wall isolating the closed zone from outside.

In FIG. 2 which is a schematic illustration of a cross sectional view of an example where, in the method of the present invention, a second cylindrical rotor is further installed, in addition to the first cylindrical rotor between the ascending gas flow channel and the descending gas flow channel, between the ascending gas flow channel and the partition wall isolating the closed zone from outside, a second cylindrical rotor 12 having, according to need, gas escape openings 13, . . . is installed between the first cylindrical rotor 2 and the cylindrical partition wall 1 in addition to the constitution described for the aforementioned FIG. 1 and this is subject to induced rotation by the movement of the gas flow in the cylindrical partition wall 1 thereby to further decrease the friction between the ascending gas flow and the descending gas flow.

And, the gas between G and H is outwardly compressed between E and F by the centrifugal force to generate a heat of compression which can be effectively utilized to increase the temperature difference with the cooling medium contributing to an increase in the efficiency of heat exchange. The gas in the vicinity of F deprived of heat is drastically contracted and imparted with a great centrifugal force between A and B under increasing of the specific gravity.

Nextly, when the gas between A and B flows to enter between B and C, a still greater centrifugal force is imparted thereto but no compression is produced thereby by virtue of the gas escape openings 13, . . . so that no heat of compression is generated and expansion is caused by heat exchange with the high-temperature medium existing between B and C to cause a decrease in the specific gravity. And, the gas having a decreased specific gravity is imparted with a small centrifugal force between C and D which is cancelled by the large centrifugal force imparted between A and B to continue circulation so that a strong energy of convolution is brought about. It is preferable here, in order to accelerate setup at the moment of starting, to temporarily urge revolution by means of a motor.

Nextly, a description is given of a suitable example of the device to realize the method of the present invention by making reference to the accompanying drawing.

Figure 3:
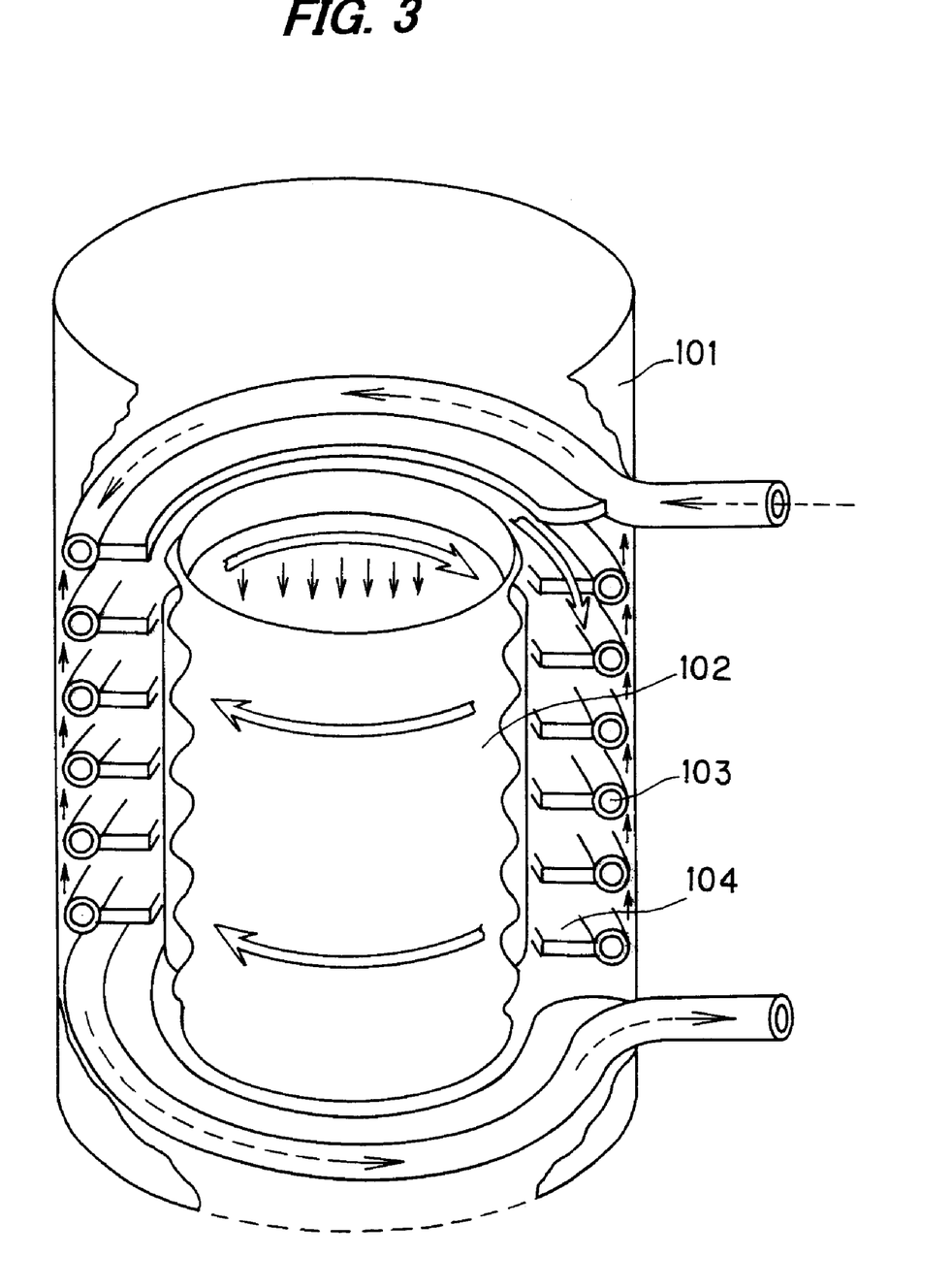
FIG. 3 is an inclinatory view of the device of the present invention as an example.
Figure 4:
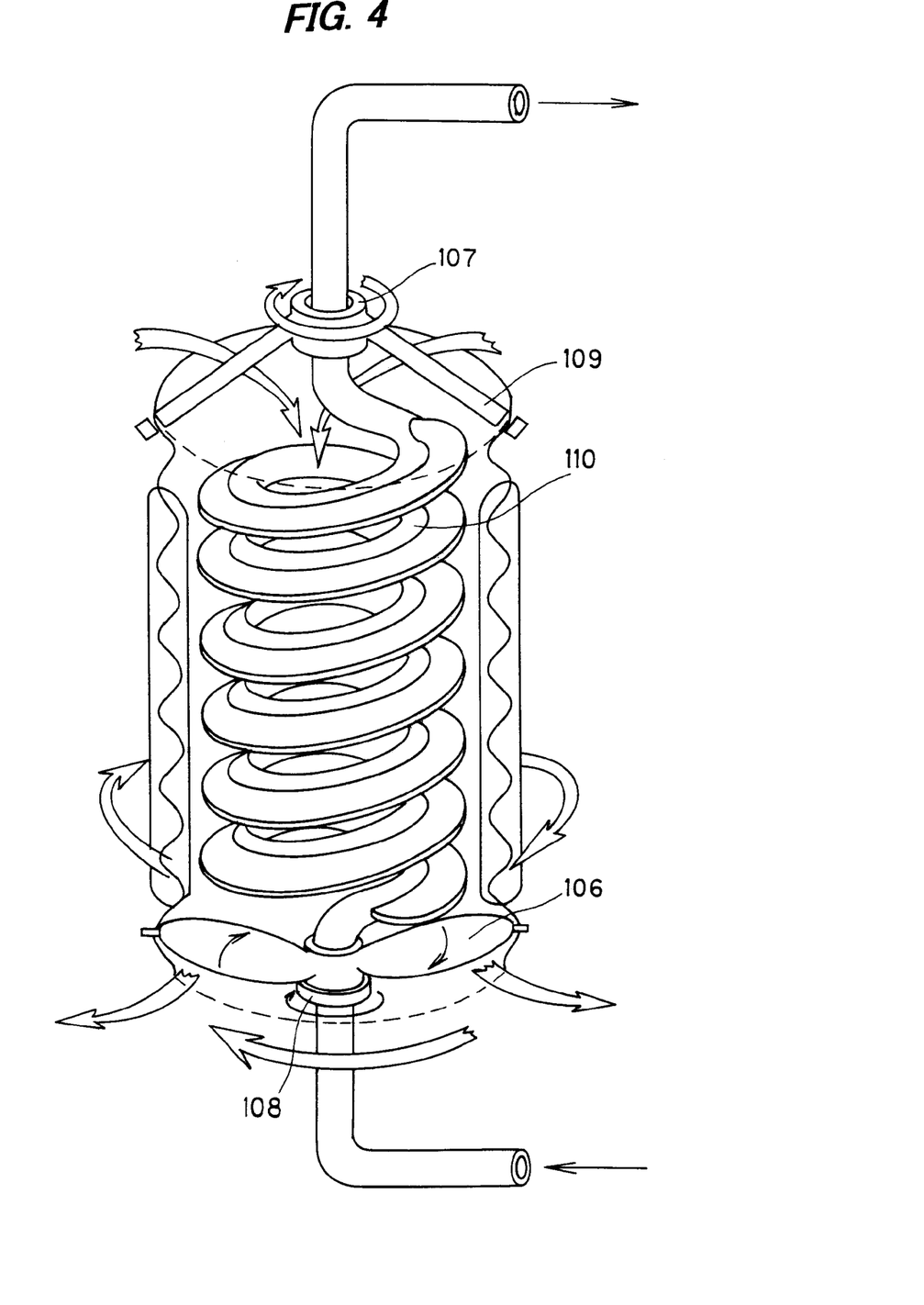
FIG. 4 is an inclinatory view showing the structure of the cylindrical rotor in FIG. 3 as an example.

FIG. 3 is an inclinatory view of an example of the inventive device with partial cutting-open and FIG. 4 is an inclinatory view showing an example of the structure of the cylindrical rotor on FIG. 3.

In FIG. 3, the device of the present invention is constituted with such a structure that a cylindrical rotor 102 is contained inside of a cylinder 101 and a high-temperature medium feed pipe 103 spirally surrounds the circumference thereof. The high-temperature medium feed pipe 103 is provided over the whole length with an inwardly extending fin 104 to promote heat exchange.

FIG. 4 shows an example of the cylindrical rotor 102 contained in this device and a rotatable vane 106 is fixedly connected to the bottom surface of this cylindrical rotor 102 to be mounted to the cylinder 101 in a freely rotatable fashion by means of pivotally supporting members 107 and 108 and arms 109, . . . to isolate the spiral-formed low-temperature medium feed pipe 110 from the aforementioned high-temperature medium feed pipe 103 disposed inside thereof. It is essential that the pivotally supporting members 107 and 108 used here have such a structure as to allow smooth revolution of the cylindrical rotor 102 without loading. Such ones include, for example, those with a decreased friction by using a bearing, those of the liquid-seal type with mercury, those of magnet supporting type, those of the frictionless type by means of a superconductor and so on.

And, when, in the device having such a structure, a high-temperature medium and a low-temperature medium are introduced to the high-temperature medium feed pipe 103 and to the low-temperature medium feed pipe 110, respectively, the gas in the cylinder 101 is heated in the vicinity of the high-temperature medium feed pipe 103 and the fin 104 to form an ascending flow and the gas in the cylindrical rotor 102 is cooled by contacting with the low-temperature medium feed pipe 110 to form a descending flow.

And, the ascending flow and the descending flow produced in this manner are not in contact each with the other until reaching the bottom of the cylinder 101 or therearound and therefore they can be utilized for generation of a whirling flow without being accompanied by a loss of energy due to friction so that, by disposing a fan for starting-up in that part, a violent rotation is caused and an electric power as desired can be obtained with a good efficiency by connecting a power generating motor to this starting-up fan via the output shaft.

It is optional that the aforementioned cylindrical rotor 102 has such a structure that the wall surface thereof is formed with undulation and baffle plates to inhibit the gas flow are provided to the bottoms of the wavy form at specified intervals or such a structure that the baffle plates are provided with inclination toward the direction of the flow thereby to cancel the pressure vector of the flow in collision thereto by the pressure vector in the direction of the flow channel in the cylindrical rotor 102 and outside thereof so as to decrease leak-out of the gas. Further, the cylindrical rotor 102 here need not be in a cylindrical form of a uniform diameter from up to down but can be in the form of a conical frustum having different diameters between top and bottom.

Figure 5:
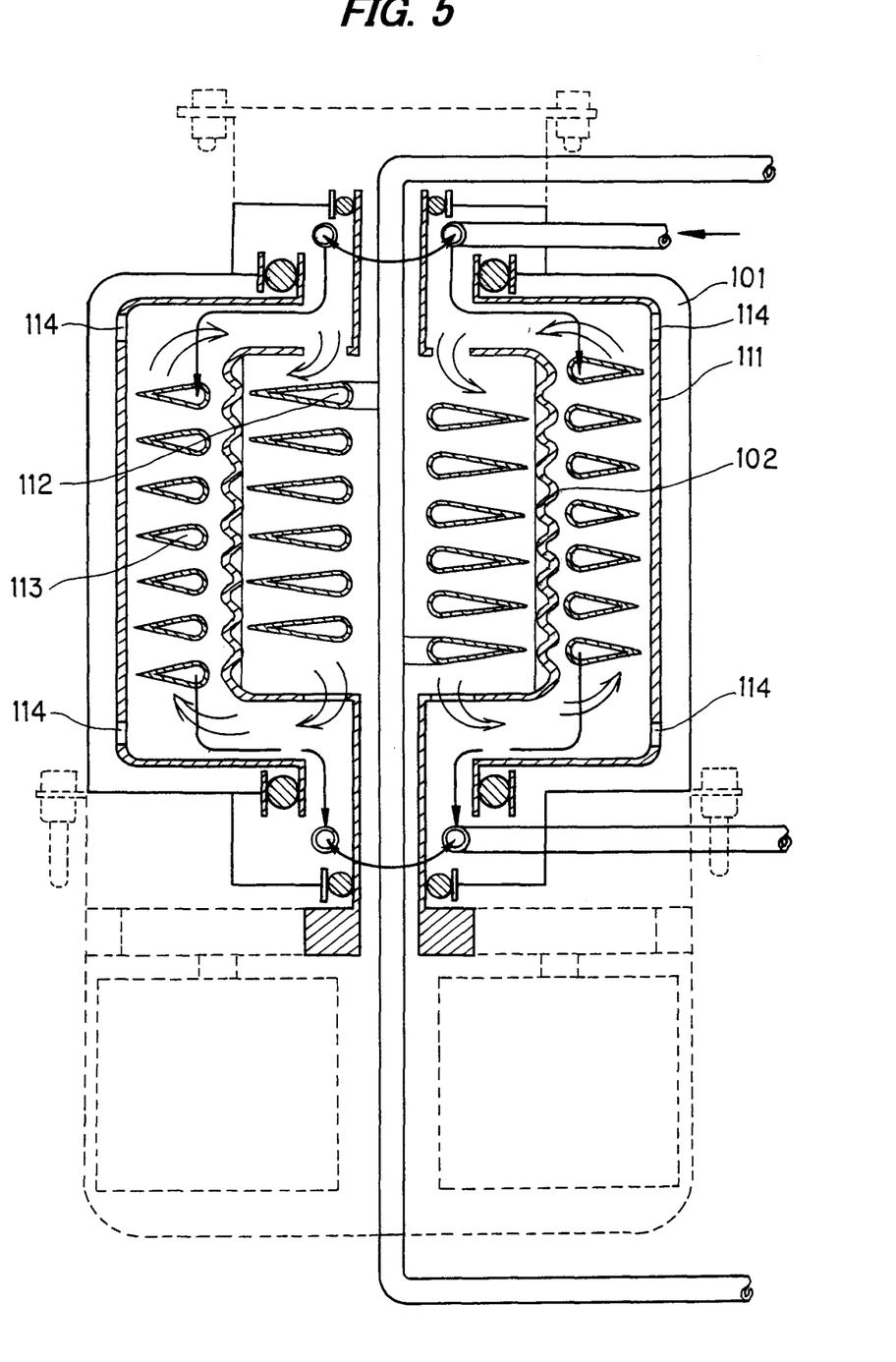
FIG. 5 is a schematic illustration of a cross sectional view of an example, in the device of the present invention, in which two cylindrical rotors are installed between the ascending gas flow channel and the descending gas flow channel and between the ascending gas flow channel and the partition wall isolating the closed zone from outside.

Nextly, FIG. 5 is a schematic cross sectional view showing an example of the device having two cylindrical rotors installed between the ascending gas flow channel and the descending gas flow channel and between the ascending gas flow channel and the partition wall isolating the closed zone from outside.

In this figure, two cylindrical rotors 102 and 111 are contained in the cylinder 101 and they are mounted coaxially and concentrically in an independently rotatable fashion. The first cylindrical rotor 102 inside isolates the descending gas flow channel formed by the low-temperature medium feed pipe 112 in a spiral form and the ascending gas flow channel formed by the high-temperature medium feed pipe 113 to inhibit contacting of the descending flow and the ascending flow.

On the other hand, the second cylindrical rotor 111 outside is disposed between the ascending gas flow channel formed by the high-temperature medium feed pipe 113 and the inner wall of the cylinder 101 to suppress the velocity reduction of the ascending flow due to friction between the ascending flow with the wall surface of the cylinder 101 along with prevention of generation of heat due to high friction and heat of compression due to compression of the gas against the surrounding walls by the centrifugal force.

It is preferable that the cylindrical rotor 111 outside is provided with gas escape openings 114, . . . at appropriate positions for dissipation of the gas which is imparted with an increased specific gravity under compression by the centrifugal force.

The gas escape openings 114, . . . are formed desirably by boring with an angle in a direction reverse to the rotating direction of the cylindrical rotor 111 in such a fashion as to promote rotation of the cylindrical rotor 111.

In the device of the present invention constituted in this way, a low-temperature medium and a high-temperature medium are introduced to the low-temperature medium feed pipe 112 and to the high-temperature medium feed pipe 113, respectively, so that a descending flow is generated inside of the first cylindrical rotor 102 and an ascending flow is generated outside thereof so that a whirling flow is generated in the lower part of the cylinder 101 by the convection circulating in the direction of the arrow mark in FIG. 5.

In this case, the first cylindrical rotor 102 is rotated by means of the fan (not shown in the figure) fixedly provided at the bottom thereof for capturing the whirling flow so as to increase the velocity of the ascending flow. Further, the second cylindrical rotor 111 is also brought into induced rotation to mitigate compression of the gas by the centrifugal force along with further promotion of formation of a whirling flow by means of the ejection force from the gas escape openings 114, . . . so that the aforementioned fan is rotated more violently and the efficiency of power generation can be greatly increased in electric power generation by utilizing the same.

EXAMPLE 1

Figure 6:
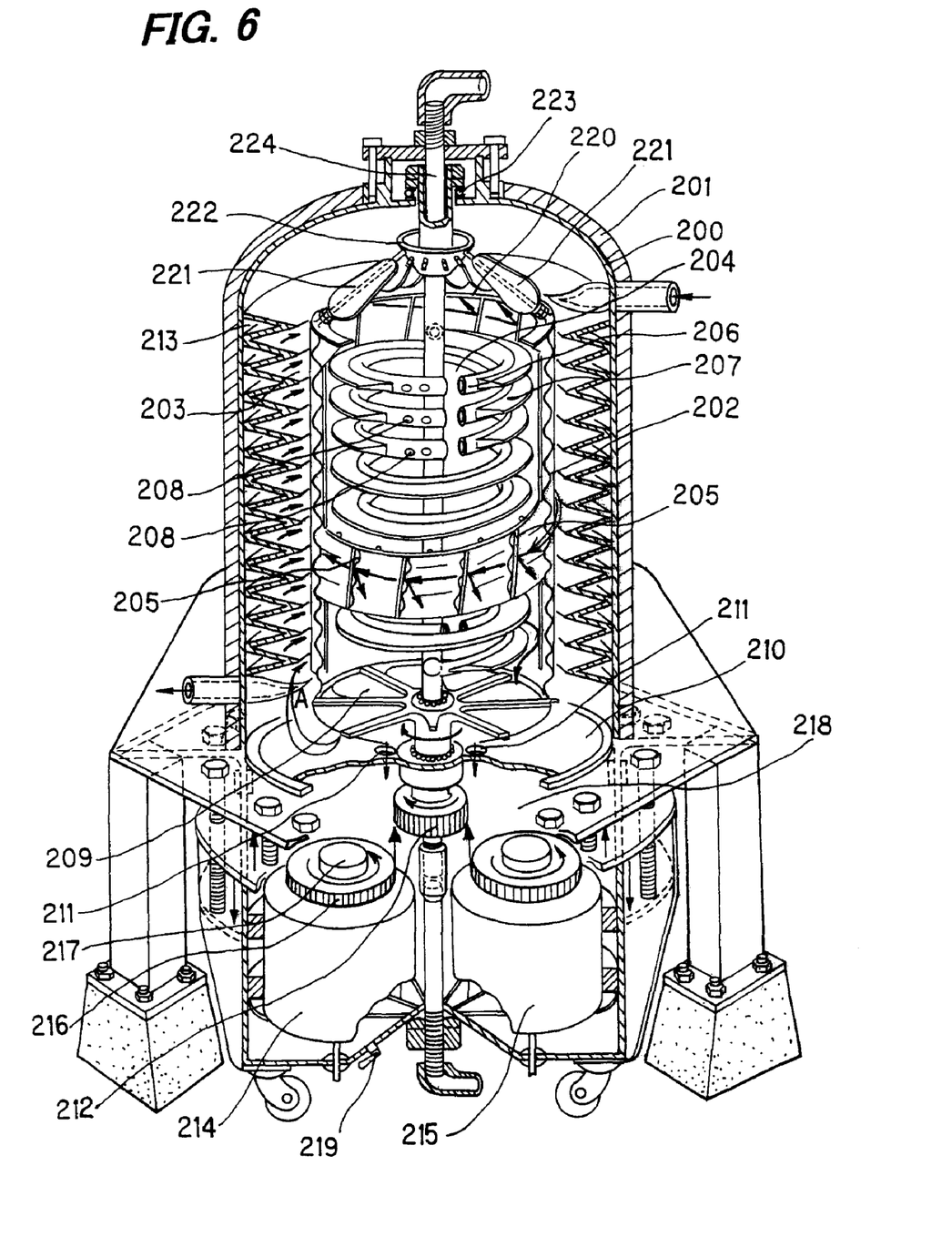
FIG. 6 is a schematic illustration of a cross sectional view showing an example of the device of the present invention.

FIG. 6 is for an example where a single cylindrical rotor is contained in the device of the present invention which has such a structure that a single cylindrical rotor 202 is disposed inside of a cylinder 200 covered with a heat-insulating protective material 201.

In this figure, the cylindrical rotor 202 is brought under induced rotation by the gas A under convection through the ascending gas flow channel 203 and the descending gas flow channel 204 to greatly increase the power output by suppressing attenuation of energy due to friction of the gas. The aforementioned cylindrical rotor 202 has a wall surface with undulation by draw-working and baffle plates 205, . . . are attached to the bottom parts of the wavy form at an appropriate interval so that the cylindrical rotor 202 is rotated by the reaction of the pressure of the gas A received by the baffle plates 205, . . . and this rotation can be utilized to drive the power generator 214.

In this case, the baffle plates 205, . . . are attached, in order to suppress leak-out of the gas A from the gap between the ascending gas flow channel 203 or descending gas flow channel 204 and the cylindrical rotor 202, with inclination toward the direction of rotation so that leak-out of the gas A can be prevented by the reaction pressure at the collision of the gas A at the baffle plates 205, . . . .

While the descending gas flow channel 204 is formed by contacting with the spiral-formed cooling medium feed pipe 206, this cooling medium feed pipe 206 is provided with a V-formed fin 207 integrally fixed thereto over the whole length thereby to increase the rate of heat exchange along with reinforcement of the strength. This V-formed fin 207 can be imparted with a further increased rate of heat exchange by making inside hollow and by forming passage openings 208, . . . between the same and the cooling medium feed pipe 206.

The descending gas flow channel 204 is formed along the inward side of the spiral-formed cooling medium feed pipe 206 to cause rotation of the fan 209 for starting-up disposed at the lower-end opening thereof by means of the gaseous pressure thereby to start up the cylindrical rotor 202 connected to the starting-up fan 209. And, a gas is introduced by utilizing the centrifugal force from the gas outlet/inlet port 211 installed at the closure plate 210 of the cylinder 200 installed in the vicinity of the lower-end shaft bearing part of the cylindrical rotor 202 to compress and increase the pressure of the gas A in the ascending gas flow channel 203 and the descending gas flow channel 204 in the proximity of the outer circumference of the cylindrical rotor 202 so as to accomplish axis alignment without necessitating an oil seal through the output gear 212 with centrifugal clutch of the cylindrical rotor 202.

And, the closed cylinder 200 is isolated from the part of the power generator 214 by the closure plate 210 and the pressurized gas A is moved by the centrifugal force of the cylindrical rotor 202 to compensate for the windage loss by the pressure decrease in the part of the power generator 214 along with increasing/decreasing adjustment of the output of the gas A at the lower end of the cylinder 200 so as to take out the electric energy by securing safety of the pressurized gas A.

The heating medium feed pipe 213 consists of bellows-structured body provided in a spiral form over the inner wall of the cylinder 200 and the outer wall of the cylindrical rotor 202 and has such a structure that the heating medium is introduced into the gap space on the inner wall of the cylinder 200 and the gap space on the outer wall of the cylindrical rotor 202 serves as the ascending gas flow channel 203.

As to the heating medium feed pipe 213, it is possible to adjust the flow-rate cross section and the cross section of the outer surface area and the ascending gas flow channel to be in compliance with the density of the gas A by modifying the angle or length of the respective raised and recessed parts of the spiral-formed bellows.

And, the heat-exchange area of the aforementioned spiral-formed bellows can further be increased by providing a spiral-formed V-shaped fin on the inner wall of the cylinder 200 along with improvement in the pressure-resistive strength of the cylinder 200 in the axial direction.

On the central lower end of the cylinder 200 in this device, there is mounted an output gear 212 with a centrifugal clutch engaged with a gear 216 for power generation, which serves to drive the power generator 214 through an electromagnetic clutch 217. This output gear 215 with a centrifugal clutch is in a free condition at the moment of starting when the rotation torque is small and is automatically brought into the connected condition only in normal rotation. In failure of the power generator 214, this output gear 212 with a centrifugal clutch can be utilized for immediate switching to another power generator 215.

It is usual that, when the cylindrical rotor 202 is rotated at a high velocity with the cock 219 of the power generator part 218 of the cylinder 200 left open, the gas existing within the rotor is compressed against the surrounding walls of the rotor by the centrifugal force thereof so that, consequently, a negative pressure is produced in the central part of the rotor. It follows that the gas in the power generator part 218 is suctioned from the gas flow opening in the closure plate at the bottom of the cylinder 202 and this part is brought under a subatmospheric pressure so that the gas in the outer side of the cock 219 enters the power generator part 218.

The device under operation can be stopped by terminating supply of the heating medium and the cooling medium to the heating medium feed pipe 213 and to the cooling medium feed pipe 206. By conducting in this way, the temperature difference between the ascending gas flow channel 203 and the descending gas flow channel 204 becomes cancelled to cause disappearance of the convection of the gas in the cylinder 200 and rotation of the cylindrical rotor 202 is also terminated. The outer gas suctioned is discharged through the cock 219 so that safety can be ensured.

On the other hand, a turn buckle holder 222 equipped with a turn doughnut 220 and turn buckle fans 221, . . . is provided at the upper end of the cylindrical rotor 202 and the condition of convection of the gas A can be controlled by modifying the angles of the vanes of the turn buckle fans 221, . . . .

And, the turn buckle holder 222 is connected to a thrust bearing 223 and, while keeping the cylinder 200 in a hermetic condition, the cylindrical rotor 202 is enabled to rotate and the cooling medium is led to the cooling medium feed pipe 206 by way of the cooling main pipe 224 penetrating the center thereof so that rotation of the cylindrical rotor 202 can be smoothly continued without being disturbed in any way.

EXAMPLE 2

Figure 7:
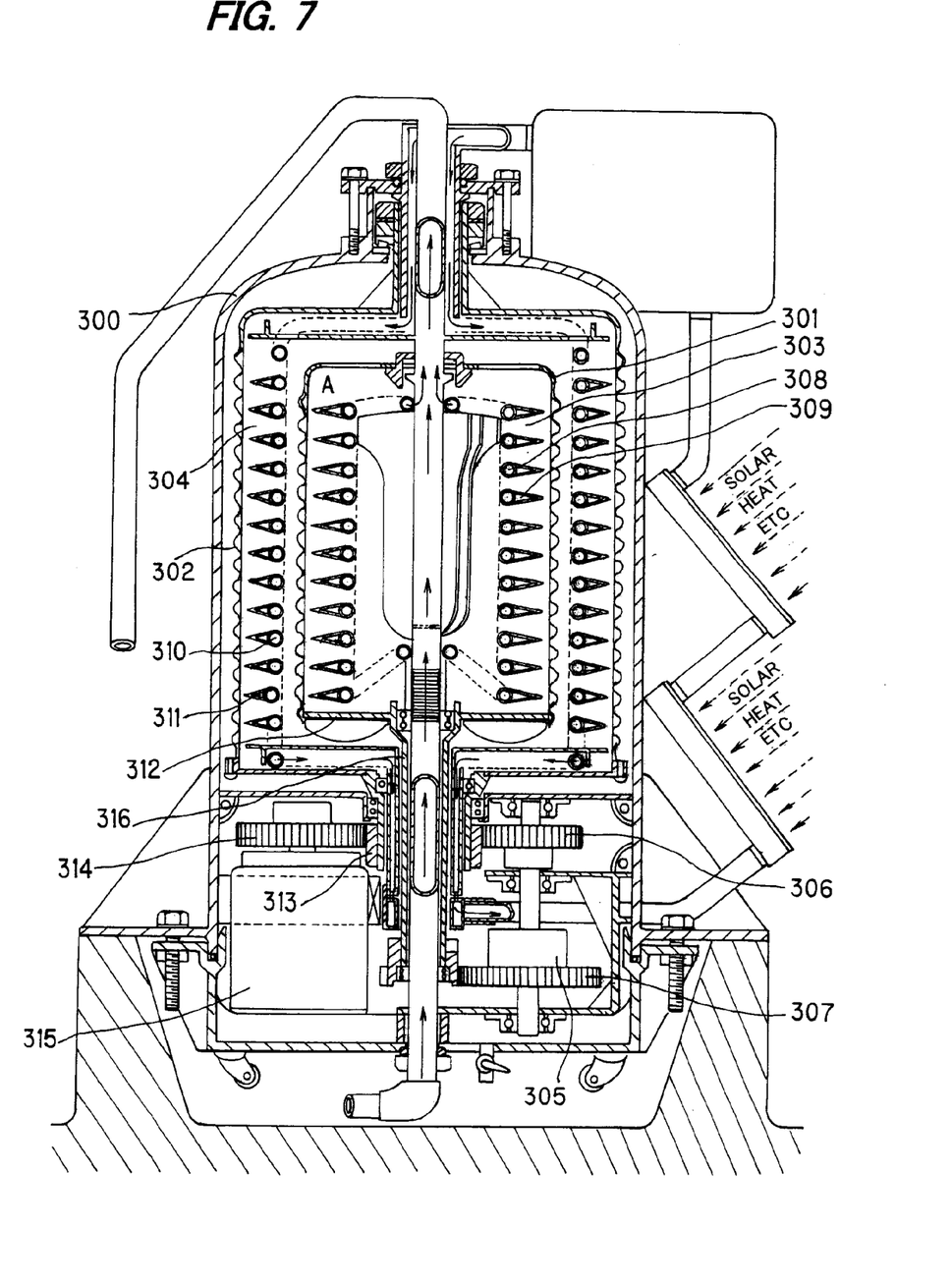
FIG. 7 is a schematic illustration of a cross sectional view showing another example of the device of the present invention.

FIG. 7 shows an example of the device which contains two cylindrical rotors 301,302 in the cylinder 300, in which the solar heat is utilized as the heating source for the high-temperature medium.

In this device, a second cylindrical rotor 302, which serves to reduce the friction between the ascending gas flow channel 304 and the inner wall of the cylinder 300, is installed in addition to the first cylindrical rotor 301 which serves to cut off contacting between the descending gas flow channel 303 and the ascending gas flow channel 304. The first cylindrical rotor 301 and the second cylindrical rotor 302 are connected by the gears 306,307 with differential rotation through a centrifugal clutch 305 so that rotation can be adjusted adequately in compliance with the intended load on the power generator 315.

In this device, when the first cylindrical rotor 301 is rotated at a high velocity, the pressurized gas A inside thereof is imparted with a centrifugal force and compressed to cause temperature elevation so as to increase the rate of heat exchange by virtue of the increased temperature difference with the descending gas flow channel 303 in proximity thereof while, on the other hand, when the second cylindrical rotor 302 is rotated at a low velocity, the pressurized gas A thereof receives decreased centrifugal compression to be expanded with a temperature decrease so as to increase the temperature difference with the ascending gas flow channel 304 with an increased rate of heat exchange resulting in a great increase in the power output even with a small temperature difference.

In this case, a great differential rotation as desired can be obtained by selecting a small number of teeth in the gear 306 and a large number of teeth in the gear 307 while this gear ratio must be determined in consideration of the temperature difference to be produced, density of the pressurized gas A and others.

In this figure, a low-temperature medium feed pipe 308 is installed in a spiral form for the formation of a descending gas flow channel 303 within the first cylindrical rotor 301 having the wall surface shaped in a wavy form and this low-temperature medium feed pipe 308 is adjoined over the whole length with a V-shaped fin 309 made hollow inside to improve heat exchange.

And, a feed pipe 310 for the high-temperature medium heated by the solar heat is installed in a spiral form to the second cylindrical rotor 302 also having the wall surface shaped in a wavy form and it is also adjoined over the whole length with a V-shaped fin 311 made hollow inside for improving heat exchange. A starting fan 312 is fixedly installed in the vicinity of the bottom surface of the first cylindrical rotor 301 and is connected to the power generator 315 through a rotation shaft 316 and gears 313,314.

Electricity can be generated in the same manner as in Example 1 in the thus constituted power-generating device, which can be stopped also in the same way.

INDUSTRIAL UTILIZABILITY

The present invention has a high utilization value as a clean power supply source since electricity can be generated in a high efficiency by utilizing the phenomenon of temperature difference formation occurring in nature such as, for example, temperature elevation by the solar heat, temperature difference in the sea, temperature difference by the geothermal heat and so on.

What is claimed is:

1. A method for electric power generation by convection characterized in that, in a method for electric power generation which comprises forming, in a cylindrical closed zone containing a gas sealed therein, a descending gas flow channel inward and an ascending gas flow channel outer side thereof, generating a whirling flow by the synergistic interaction of the descending gas flow and the ascending gas flow and rotating a power-generating turbine by the whirling flow to generate electric power, the descending gas flow channel and the ascending gas flow channel are isolated each from the other by a cylindrical rotor therebetween.

2. A method for electric power generation by convection characterized in that, in a method for electric power generation which comprises forming, in a cylindrical closed zone containing a gas sealed therein, a descending gas flow channel inward and an ascending gas flow channel outer side thereof, generating a whirling flow by the synergistic interaction of the descending gas flow and the ascending gas flow and rotating a power-generating turbine by the whirling flow to generate electric power, the descending gas flow channel and the ascending gas flow channel are isolated each from the other and the ascending gas flow channel is isolated from the cylindrical closed zone by cylindrical rotors.

3. A device for electric power generation by convection which comprises a cylinder filled with a gas, a cylindrical rotor pivotally supported at the top and at the bottom therein containing a spiral-formed low-temperature medium feed pipe, a spiral-formed high-temperature medium feed pipe installed along the outside of the cylindrical rotor and a starting fan fixedly installed to the bottom of the cylindrical rotor.

4. A device for electric power generation by convection which comprises a cylinder filled with a gas, a first cylindrical rotor therein pivotally supported at the top and at the bottom and containing a spiral-formed low-temperature medium feed pipe, a spiral-formed high-temperature medium feed pipe installed along the outer side of the first cylindrical rotor and a second cylindrical rotor isolating the high-temperature medium feed pipe and the inner wall of the cylinder each from the other.

5. The device for electric power generation by convection described in claim 3 in which a fin for heat exchange promotion is adjoined to the low-temperature medium feed pipe and to the high-temperature medium feed pipe.

6. The device for electric power generation by convection described in claim 4 in which a plurality of gas escape openings are formed in the side wall of the second cylindrical rotor.

7. The device for electric power generation by convection described in claim 4 in which a fin for heat exchange promotion is adjoined to the low-temperature medium feed pipe and to the high-temperature medium feed pipe.

* * * * *